United States Patent
Hosaka et al.

(10) Patent No.: US 7,141,634 B2
(45) Date of Patent: Nov. 28, 2006

(54) CATALYST FOR OLEFIN POLYMERIZATION AND PROCESS FOR POLYMERIZING OLEFINS

(75) Inventors: Motoki Hosaka, Chigasaki (JP); Hiroyuki Kono, Chigasaki (JP); Hayashi Ogawa, Chigasaki (JP)

(73) Assignee: Toho Catalyst Co., Ltd., Kurobe (JP)

( * ) Notice: Subject to any disclaimer, the term of this patent is extended or adjusted under 35 U.S.C. 154(b) by 34 days.

(21) Appl. No.: 11/121,061

(22) Filed: May 4, 2005

(65) Prior Publication Data

US 2005/0250918 A1    Nov. 10, 2005

(30) Foreign Application Priority Data

May 6, 2004    (JP)    ............................. 2004-137298

(51) Int. Cl.
   *C08F 4/42*    (2006.01)
(52) U.S. Cl. ................ 526/124.9; 526/348; 526/124.3; 526/124.2; 526/126; 526/128; 502/103; 502/115; 502/116
(58) Field of Classification Search ................ 526/351, 526/348, 904, 141, 125.6, 125.3, 126, 128, 526/124.3, 124.2, 124.9; 502/103, 115, 116
See application file for complete search history.

(56) References Cited

U.S. PATENT DOCUMENTS 5,438,110 A * 8/1995 Ishimaru et al. ......... 526/124.5
6,214,939 B1 * 4/2001 Shinozaki et al. .......... 525/270

FOREIGN PATENT DOCUMENTS

| JP | 57-63310 | | 4/1982 |
| JP | 57-63311 | | 4/1982 |
| JP | 63-3010 | | 1/1988 |
| JP | 1-315406 | | 12/1989 |
| JP | 2-84404 | | 3/1990 |
| JP | 10-158318 A | * | 6/1998 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A catalyst for olefin polymerization comprising (A) a solid catalyst component which is prepared by causing (a) a magnesium compound, (b) a tetravalent titanium halide compound, and (c) an electron donor compound to come in contact with each other, (B) an organoaluminum compound of the formula $R^1_p AlQ_{3-p}$, and (C) an organosilicon compound of the formula $SiR^2 R^3 (OR^4)(OR^5)$, and (D) an organosilicon compound of the formula $R^6_x Si(OR^7)_{4-x}$ exhibits a higher hydrogen activity than conventional catalysts.

6 Claims, 1 Drawing Sheet

FIGURE 1

(A) Transition metal component
    (a) Magnesium compound
    (b) Tetravalent titanium halide
    (c) Electron donor compound (B) Organoaluminum component
    $R^1_p AlQ_{3-p}$
    $0 < p \leq 3$ (C) Organosilicon compound
    $SiR^2 R^3 (OR^4)(OR^5)$ (D) Organosilicon compound
    $R^6_x Si(OR^7)_{4-x}$ Olefin

US 7,141,634 B2

CATALYST FOR OLEFIN POLYMERIZATION AND PROCESS FOR POLYMERIZING OLEFINS

TECHNICAL FIELD

The present invention relates to a catalyst for olefin polymerization which can produce olefin polymers with a broad molecular weight distribution in a high yield while maintaining high stereoregularity of the olefin polymers and to a process for polymerizing olefins in the presence of the catalyst.

BACKGROUND ART

Conventionally, a number of methods for polymerizing or copolymerizing olefins in the presence of a catalyst for olefin polymerization comprising a solid catalyst component containing magnesium, titanium, an electron donor compound, and halogen as essential components, an organoaluminum compound, and an organosilicon compound have been proposed.

For example, Patent Document 1 (Japanese Patent Application Laid-open No. 63310/1982) and Patent Document 2 (Japanese Patent Application Laid-open No. 63311/1982) propose a process for polymerizing olefins with three or more carbon atoms, in which a catalyst comprising a combination of a solid catalyst component containing a magnesium compound, titanium compound, and an electron donor, an organoaluminum compound, and an organosilicon compound having a Si—O—C bond is used. However, because this process is not necessarily satisfactory for producing highly stereoregular polymers in a high yield, further improvement of the process has been desired.

Patent Document 3 (Japanese Patent Application Laid-open No. 3010/1988) proposes a catalyst for olefin polymerization and a process for polymerizing olefins in the presence of the catalyst. The catalyst for olefin polymerization comprises a solid catalyst component, prepared by heat-processing of a powdered product obtained by causing dialkoxymagnesium, aromatic dicarboxylic acid diester, aromatic hydrocarbon, and titanium halide to come in contact with each other, an organoaluminum compound, and an organosilicon compound.

Patent Document 4 (Japanese Patent Application Laid-open No. 315406/1989) proposes another catalyst for olefin polymerization and a process for polymerizing olefins in the presence of this catalyst. The catalyst for olefin polymerization comprises a solid catalyst component prepared by causing a suspension containing diethoxymagnesium and alkylbenzene to come in contact with titanium tetrachloride, reacting the suspension with phthalic acid dichloride, and causing the resulting solid product to come in contact with titanium tetrachloride in the presence of alkylbenzene, an organoaluminum compound, and an organosilicon compound.

Patent Document 5 (Japanese Patent Application Laid-open No. 84404/1990) proposes a catalyst for olefin polymerization comprising a solid titanium catalyst component containing magnesium, titanium, and halogen as the essential components obtained by causing a magnesium compound and a titanium compound to come in contact with each other, an organoaluminum compound catalyst component, and an organosilicon compound catalyst component containing a cyclopentyl group, cyclopentenyl group, cyclopentadienyl group, or a derivative of these groups, as well as a process for polymerizing or copolymerizing olefins in the presence of this catalyst.

All of the above-described conventional technologies have attained excellent results in improving the catalyst activity to enable omission of an ash-removal step for removing catalyst residues such as chlorine and titanium from the formed polymers, improving the yield of stereoregular polymers, and improving the durability of the catalyst activity during the polymerization.

However, olefin polymers obtained by polymerizing olefins using a catalyst for olefin polymerization containing this type of highly active catalyst component, an organoaluminum compound, and an organosilicon compound have been found to possess a molecular weight distribution narrower than that of olefin polymers obtained by polymerizing olefins using a catalyst for olefin polymerization in which the conventional titanium trichloride catalyst component is combined with an organoaluminum compound and, optionally, an electron donor compound as the third component. The narrow molecular weight distribution leads to a low melting viscoelasticity of the polymer to be processed, which gives rise to an impaired outward appearance of the final products (polyolefins). The application of the olefin polymers must be limited to a certain degree.

Various ideas have been put into practice in an attempt to solve this problem. One example is using multi-stage polymerization to obtain polyolefin with a broad molecular weight distribution. However, the multi-stage polymerization involves undesirable features including a high cost such as repetition of a complicated polymerization process and reclaiming of a chelating agent used in the polymerization.

Patent Document 6 (Japanese Patent Application Laid-open No. 7703/1991) proposes a process for polymerizing olefins in the presence of a catalyst for olefin polymerization comprising a solid titanium catalyst component containing magnesium, titanium, halogen, and an electron donor as essential components, an organoaluminum compound, and at least two electron donors (organosilicon compounds).

The applicants claim that the target polyolefin with a broad molecular weight distribution can be obtained without requiring a complicated multi-stage polymerization. However, the requirement of using two or more organosilicon compounds as electron donors during polymerization makes the process complicated.

Accordingly, an object of the present invention is to solve the above problems remaining in the prior art and to provide a catalyst for olefin polymerization and a process for polymerizing olefins, which can produce olefin polymers having a broad molecular weight distribution by a simple procedure while maintaining high stereoregularity.

DISCLOSURE OF THE INVENTION

In view of this situation, the present inventors have conducted extensive studies. As a result, the present inventors have found that an olefin polymer with a high stereoregularity and a broad molecular weight distribution can be obtained in a high yield by polymerizing olefins using a catalyst formed from a solid catalyst component made from a magnesium compound, tetravalent titanium halide, and an electron donor compound as raw materials, an organoaluminum compound, and two types of organosilicon compounds having specific structures. This finding has led to the completion of the present invention.

BRIEF DESCRIPTION OF THE DRAWINGS

FIG. 1 is a flowchart showing a process for preparing the catalyst component and polymerization catalyst of the present invention.

SUMMARY OF THE INVENTION

Specifically, the present invention provides a catalyst for olefin polymerization comprising:

(A) a solid catalyst component prepared by causing (a) a magnesium compound, (b) a tetravalent titanium halide compound, and (c) an electron donor compound to come in contact with each other, (B) an organoaluminum compound of the following formula (1), $$R^1_p AlQ_{3-p} \quad (1)$$

wherein $R^1$ represents an alkyl group having 1–4 carbon atoms, Q represents a hydrogen atom or a halogen atom, and p represents a real number satisfying the formula $0<p\leq 3$, and (C) an organosilicon compound of the following formula (2), $$SiR^2R^3(OR^4)(OR^5) \quad (2)$$

wherein $R^2$ is a cyclohexyl group or its derivative, $R^3$ is a cyclohexyl group, its derivative, a cyclopentyl group, or its derivative, $R^4$ and $R^5$ individually represents an alkyl group having 1–3 carbon atoms, and (D) an organosilicon compound of the following formula (3), $$R^6_x Si(OR^7)_{4-x} \quad (3)$$

wherein $R^6$ individually indicates a halogen atom selected from the group consisting of a chlorine atom, a bromine atom, and an iodine atom, a linear or branched alkyl group having 1–12 carbon atoms, with one or two hydrogen atoms replaced by halogen atoms, or a linear or branched alkyl group or cycloalkyl group having 1–12 carbon-atoms, $R^7$ individually represents an alkyl group having 1–4 carbon-atoms, cycloalkyl group, phenyl group, vinyl group, allyl group, or an aralkyl group, and X is an integer of 0, 1 or 2, provided that when x is 1 or 2, at least one of $R^6$ groups is a halogen atom or a linear or branched alkyl group having 1–12 carbon atoms with one or two hydrogen atoms replaced by halogen atoms.

The present invention further provides a process for polymerizing olefins characterized by polymerizing or copolymerizing olefins in the presence of the above catalyst for olefin polymerization.

The catalyst for polymerization of olefins of the present invention can produce olefin polymers having higher stereoregularity and a broader molecular weight distribution in a higher yield than conventional catalysts. The catalyst is thus expected not only to produce polyolefins for common use at a low cost, but also to be useful in the manufacture of olefin polymers having high functions.

DETAILED DESCRIPTION OF THE INVENTION AND PREFERRED EMBODIMENTS

For preparing the solid catalyst component (A) (hereinafter referred to from time to time as "component (A)") in the catalyst for olefin polymerization of the present invention, (a) a magnesium compound, (b) a tetravalent titanium halide compound, and (c) an electron donor compound are caused to come in contact with each other in a solid product forming step. As the magnesium compound (hereinafter referred to from time to time as "component (a)") used in the solid product forming step, magnesium dihalide, dialkyl magnesium, alkylmagnesium halide, dialkoxy magnesium, diaryloxy magnesium, alkoxy magnesium halide, fatty-acid magnesium, and the like can be given. Dialkoxy magnesium is preferable among these magnesium compounds. Specific examples include dimethoxymagnesium, diethoxymagnesium, dipropoxymagnesium, dibutoxymagnesium, ethoxymethoxymagnesium, ethoxypropoxymagnesium, and butoxyethoxymagnesium. Of these, diethoxymagnesium is particularly preferable. These dialkoxy magnesium compounds may be prepared by reacting metallic magnesium with an alcohol in the presence of a halogen or a halogen-containing metal compound. The above dialkoxy magnesium compounds may be used either individually or in combination of two or more.

The dialkoxymagnesium compound used for preparing the component (A) in the solid product forming step may be in the form of either granules or powder and either amorphous or spherical in the configuration. For example, when spherical dialkoxy magnesium is used, the resulting polymer is in the form of a powder having a more excellent granular form and a narrower particle distribution. This improves operability of the polymer powder produced during polymerization operation and eliminates problems such as clogging caused by fine particles contained in the polymer powder.

The spherical dialkoxy magnesium need not necessarily be completely spherical, but may be oval or potato-shaped. Specifically, the particles may have a ratio (1/w) of the major axis diameter (1) to the minor axis diameter (w) usually of 3 or less, preferably of 1 to 2, and more preferably of 1 to 1.5.

Dialkoxy magnesium with an average particle size from 1 to 200 μm can be used. A more preferable average particle size is 5 to 150 μm. In the case of spherical dialkoxy magnesium, the average particle size is usually from 1 to 100 μm, preferably from 5 to 50 μm, and more preferably from 10 to 40 μm. A powder having a narrow particle size distribution with a small content of fine and coarse powder is preferably used. Specifically, the content of particles with a diameter of 5 μm or less should be 20% or less, and preferably 10% or less. On the other hand, the content of particles with a diameter of 100 μm or more should be 10% or less, and preferably 5% or less. Moreover, the particle size distribution represented by ln (D90/D10), wherein D90 is a particle size of 90% of the integrated particle size and D10 is a particle size of 10% of the integrated particle size, is 3 or less, and preferably 2 or less.

Methods for producing such spherical dialkoxymagnesium are described in, for example, Japanese Patent Applications Laid-open No. 58-41832, No. 62-51633, No. 3-74341, No. 4-368391, and No. 8-73388.

The tetravalent titanium halide compound (b) (hereinafter referred to from time to time as "component (b)") used for the preparation of the component (A) in the present invention is one or more compounds selected from the group consisting of a titanium halide or alkoxy titanium halide represented by the formula $Ti(OR^8)_n X_{4-n}$, wherein $R^8$ represents an alkyl group having 1–4 carbon atoms, X represents a halogen atom, and n represents an integer satisfying the formula $0<n\leq 4$.

Specific examples include, as titanium halides, titanium tetrahalides such as titanium tetrachloride, titanium tetrabromide, and titanium tetraiodide and, as alkoxytitanium halides, methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxy titanium chloride. Of these, titanium tetrahalides are preferable, with titanium tetrachloride being particularly preferable. These titanium compounds may be used either individually or in combination of two or more.

The electron donor compound (hereinafter referred to from time to time as "component (c)") used for preparing the solid catalyst component (A) is an organic compound containing an oxygen atom or nitrogen atom. Alcohols, phenols, ethers, esters, ketones, acid halides, aldehydes, amines, amides, nitriles, isocyanates, and organosilicon compounds containing an Si—O—C bond can be given as examples.

As specific examples, alcohols such as methanol, ethanol, n-propanol, and 2-ethyl hexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-isopentyl-1,3-dimethoxy propane; monocarboxylic acid esters such as methyl formate, ethyl acetate, vinyl acetate, propyl acetate, octyl acetate, cyclohexyl acetate, ethyl propionate, ethyl lactate, methyl benzoate, ethyl benzoate, propyl benzoate, butyl benzoate, octyl benzoate, cyclohexyl benzoate, phenyl benzoate, methyl p-toluate, ethyl p-toluate, methyl anisate, and ethyl anisate; dicarboxylic acid esters such as diethyl malonate, dipropyl malonate, dibutyl malonate, diisobutyl malonate, dipentyl malonate, dineopentyl malonate, diethyl isopropylbromo malonate, diethyl butylbromo malonate, diethyl isobutylbromo malonate, diethyl diisopropyl malonate, diethyl dibutyl malonate, diethyl diisobutyl malonate, diethyl diisopentyl malonate, diethyl isopropylisobutyl malonate, dimethyl isopropylisopentyl malonate, diethyl bis(3-chloro-n-propyl)malonate, diethyl bis(3-bromo-n-propyl) malonate, diethyl maleate, dibutyl maleate, dimethyl adipate, diethyl adipate, dipropyl adipate, dibutyl adipate, diisodecyl adipate, dioctyl adipate, phthalic acid diesters, and phthalic acid diester derivatives; ketones such as acetone, methyl ethyl ketone, methyl butyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such as methylamine, ethylamine, tributylamine, piperidine, aniline, and pyridine; amides such as oleic acid amide and stearic acid amide; nitriles such as acetonitrile, benzonitrile, and tolunitrile; and isocyanates such as methyl isocyanate and ethyl isocyanate; and organosilicon compounds containing an Si—O—C bond such as phenyl alkoxysilane, alkyl alkoxysilane, phenylalkyl alkoxysilane, cycloalkyl alkoxysilane, and cycloalkylalkyl alkoxysilane can be given.

Of these electron donors, esters, particularly aromatic dicarboxylic acid diesters are preferable, with phthalic acid diesters and phthalic acid diester derivatives being particularly preferable. Specific examples of the phthalic acid diester include the following compounds: dimethyl phthalate, diethyl phthalate, di-n-propyl phthalate, diisopropyl phthalate, di-n-butyl phthalate, diisobutyl phthalate, ethylmethyl phthalate, methyl(isopropyl)phthalate, ethyl(n-propyl)phthalate, ethyl(n-butyl)phthalate, ethyl(isobutyl)phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl)phthalate, bis(2-ethylhexyl)phthalate, di-n-nonyl phthalate, diisodecyl phthalate, bis(2,2-dimethylheptyl)phthalate, n-butyl(isohexyl)phthalate, n-butyl(2-ethylhexyl)phthalate, n-pentylhexyl phthalate, n-pentyl(isohexyl)phthalate, isopentyl(heptyl)phthalate, n-pentyl(2-ethylhexyl)phthalate, n-pentyl (isononyl) phthalate, isopentyl(n-decyl)phthalate, n-pentylundecyl phthalate, isopentyl(isohexyl) phthalate, n-hexyl(2,2-dimethylhexyl)phthalate, n-hexyl(2-ethylhexyl) phthalate, n-hexyl(isononyl)phthalate, n-hexyl(n-decyl)phthalate, n-heptyl(2-ethylhexyl)phthalate, n-heptyl(isononyl) phthalate, n-heptyl(neodecyl)phthalate, and 2-ethylhexyl (isononyl)phthalate. One or more of these phthalic acid diesters can be used.

As the phthalic acid diester derivatives, compounds derived from phthalic acid diesters by replacing one or two hydrogen atoms on the benzene ring, to which the two alkoxycarbonyl groups of the phthalic acid diester bond, with an alkyl group having 1–5 carbon atoms or a halogen atom such as a chlorine, bromine, or fluorine can be given. The solid catalyst component prepared by using these phthalic acid diester derivatives as the electron donor can increase the melt flow rate of the polymer due to the high activity or high response of the solid catalyst component against hydrogen even in the case of using a smaller or equivalent amount of hydrogen during the polymerization. As specific examples, dineopentyl 4-methylphthalate, dineopentyl 4-ethylphthalate, dineopentyl 4,5-dimethylphthalate, dineopentyl 4,5-diethylphthalate, diethyl 4-chlorophthalate, di-n-butyl 4-chlorophthalate, dineopentyl 4-chlorophthalate, diisobutyl 4-chlorophthalate, diisohexyl 4-chlorophthalate, diisooctyl 4-chlorophthalate, diethyl 4-bromophthalate, di-n-butyl 4-bromophthalate, dineopentyl 4-bromophthalate, diisobutyl 4-bromophthalate, diisohexyl 4-bromophthalate, diisooctyl 4-bromophthalate, diethyl 4,5-dichlorophthalate, di-n-butyl 4,5-dichlorophthalate, diisohexyl 4,5-dichlorophthalate, and diisooctyl 4,5-dichlorophthalate can be given. Of these, dineopentyl 4-bromophthalate, di-n-butyl 4-bromophthalate, and diisobutyl 4-bromophthalate are preferable.

The above ester compounds are preferably used in combination of two or more. In this instance, the esters are preferably combined so that the total carbon atom number in the alkyl group possessed by one ester may differ four or more from that possessed by another ester.

The component (A) of the present invention can be preferably prepared by causing the above components (a), (b), and (c) to come in contact with each other in an aromatic hydrocarbon compound (d) (hereinafter may be simply referred to as "component (d)"). Aromatic hydrocarbon compounds having a boiling point of 50° C. to 150° C. such as toluene, xylene, and ethylbenzene are preferably used as the component (d). These aromatic hydrocarbons can be used either individually or in combination of two or more.

A particularly preferable process for preparing the solid product of the present invention comprises preparing a suspension of the component (a) in the aromatic hydrocarbon compound (d) having a boiling point of 50–150° C., causing the component (b) to come in contact with the suspension, causing the component (c) to come in contact with the resulting suspension, and reacting the mixture.

In the solid product forming step in the process of preparing the solid catalyst component (A) of the present invention, in addition to the above components, a polysiloxane (hereinafter may be simply referred to as "component (e)") can be preferably used to improve the stereoregularity or crystallinity of the formed polymer and to reduce the amount of fine polymer particles. Polysiloxanes are polymers having a siloxane bond (—Si—O bond) in the main chain and are generally referred to as silicone oil. The polysiloxanes used in the present invention are chain-structured, partially hydrogenated, cyclic, or modified polysiloxanes which are liquid or viscous at normal temperatures with a viscosity at 25° C. in the range of 0.02–100 cm$^2$/s (2–10,000 cst), and preferably in the range of 0.03–5 cm$^2$/S (3–500 cSt).

As examples of the chain-structured polysiloxane, dimethylpolysiloxane and methylphenylpolysiloxane can be given; as examples of the partially hydrogenated polysiloxane, methyl hydrogen polysiloxanes with a hydrogenation degree of 10 to 80% can be given; as examples of the cyclic polysiloxane, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane can be given; as examples of the modified polysiloxane, higher fatty acid group-substituted dimethylsiloxane, epoxy group-substituted dimethylsiloxane, and polyoxyalkylene group-substituted dimethylsiloxane can be given. Of these, decamethylcyclopentasiloxane and dimethylpolysiloxane are preferable, with decamethylcyclopentasiloxane being particularly preferable.

The solid product can be prepared by causing the above components (a), (b), and (c), and, as required, the component (d) or component (e) to come in contact with each other. The process of preparing this solid product will now be described in detail. One specific example of the process for preparing the solid component comprises suspending the magnesium compound (a) in an alcohol, a halogenated hydrocarbon solvent, the tetravalent titanium halide (b), or the aromatic hydrocarbon compound (d), and causing the electron donor compound (c) such as a phthalic acid diester and/or the tetravalent titanium halide (b) to come in contact with the suspension. In this process, a spherical solid catalyst component with a sharp particle size distribution can be obtained by using a spherical magnesium compound. Such a spherical solid catalyst component with a sharp particle size distribution can also be obtained without using a spherical magnesium compound if particles are formed by a spray dry method in which a solution or suspension is sprayed and dried using a sprayer, for example.

These components are caused to come in contact with each other in a vessel equipped with a stirrer in an inert gas atmosphere from which water and the like have been removed while stirring. The contact temperature, which is a temperature when these components are caused to come into contact with each other, may be either the same as or different from the reaction temperature. When the components are caused to come into contact with each other by stirring for preparing the mixture or are dispersed or suspended for a denaturing treatment, the components may be stirred at a comparatively low temperature of around room temperature. However, a temperature in the range of 40–130° C. is preferable to obtain the product by reacting after the contact. The reaction does not sufficiently proceed at a reaction temperature below 40° C., resulting in a solid component with inadequate properties. On the other hand, control of the reaction becomes difficult at a temperature above 130° C. due to vaporization of the solvent and the like. The reaction time is one minute or more, preferably ten minutes or more, and still more preferably 30 minutes or more.

As preferable processes for preparing the solid product of the present invention, a process comprising suspending the component (a) in the component (d), causing the resulting suspension to come in contact with the component (b), then the component (c), and causing these components to react, and a process comprising suspending the component (a) in the component (d), causing the resulting suspension to come in contact with the component (c), then the component (b), and causing these components to react can be given. The solid product thus prepared may be caused to contact with the component (b) or the components (b) and (c) once more or two or more times to improve the performance of the ultimate solid catalyst component. This contacting step is preferably carried out in the presence of the aromatic hydrocarbon compound (d).

As a preferable process for preparing the solid product of the present invention, a process of preparing a suspension of the component (a), component (c), and an aromatic hydrocarbon compound (d) having a boiling point of 50–150° C., causing this suspension to contact with a mixed solution made from the component (b) and the component (d), and reacting the mixture.

As a preferable example of the method for preparing the solid product, the following methods can be given. A suspension is prepared from the above component (a), component (b), and an aromatic hydrocarbon compound (d) having a boiling point of 50–150° C. A mixed solution is prepared from the above component (b) and the aromatic hydrocarbon compound (d) having a boiling point of 50–150° C. The above-described suspension is added to this solution. The resulting mixture is heated and reacted (a first reaction). After the reaction, the solid product is washed with a hydrocarbon compound which is liquid at normal temperatures to obtain a solid product. An additional component (b) and the aromatic hydrocarbon compound (d) having a boiling point of 50–150° C. are caused to come in contact with the washed solid product at a temperature of −20° C. to 100° C., then the temperature is raised to react the mixture (a second reaction). After the reaction, the reaction mixture is washed with a hydrocarbon compound which is liquid at normal temperatures 1–10 times to obtain a solid product.

Based on the above description, a particularly preferable process for preparing the solid catalyst component (A) comprises suspending the dialkoxy magnesium compound (a) in the aromatic hydrocarbon compound (d) having a boiling point in the range of 50–150° C., causing the tetravalent titanium halide (b) to contact the suspension, and reacting the mixture. In this instance, one or more electron donor compounds (c) such as phthalic acid diester are caused to come in contact the suspension at a temperature from −20° C. to 130° C., either before or after the tetravalent titanium halide compound (b) is contacted, then optionally the component (e) is contacted, to obtain a solid product (1). In this instance, it is desirable to carry out an aging reaction at a low temperature either before or after the above one or more electron donor compounds (c) are caused to come in contact with the suspension. After washing the solid product (1) with a hydrocarbon compound which is liquid at normal temperatures (intermediate washing), the tetravalent titanium halide (b) is again caused to contact the solid reaction product (1) in the presence of an aromatic hydrocarbon compound at a temperature of −20° C. to 100° C. to obtain a solid reaction product (2). As required, the intermediate washing and the reaction may be further repeated several times. Next, the solid reaction product (2) is washed with a hydrocarbon compound which is liquid at normal temperatures by decantation to obtain the solid catalyst component (A).

The ratio of the compounds used for the preparation of the solid catalyst component (A) cannot be generically defined, because such a ratio varies according to the method of preparation employed. For example, the tetravalent titanium halide (b) is used in an amount from 0.5 to 100 mols, preferably from 0.5 to 50 mols, still more preferably from 1 to 10 mols; the electron donor compound (c) is used in an amount from 0.01 to 10 mols, preferably from 0.01 to 1 mol, and still more preferably from 0.02 to 0.6 mol; the aromatic hydrocarbon compound (d) is used in an amount from 0.001 to 500 mols, preferably from 0.001 to 100 mols, and still more preferably from 0.005 to 10 mols; and the polysiloxane (e) is used in an amount of from 0.01 to 100 g, preferably from 0.05 to 80 g, and still more preferably from 1 to 50 g, for one mol of the magnesium compound (a).

Although there are no specific limitations to the amounts of titanium, magnesium, halogen atoms, and electron donors in the solid catalyst component (A), the content of titanium is from 1.0 to 8.0 wt %, preferably from 2.0 to 8.0 wt %, and still more preferably from 3.0 to 8.0 wt %; the content of magnesium is from 10 to 70 wt %, preferably from 10 to 50 wt %, more preferably from 15 to 40 wt %, and particularly preferably from 15 to 25 wt %; the content of halogen atoms is from 20 to 90 wt %, preferably from 30 to 85 wt %, more preferably from 40 to 80 wt %, and particularly preferably from 45 to 75 wt %; and the total amount of electron donor compounds is from 0.5 to 30 wt %, preferably from 1 to 25 wt %, and particularly preferably from 2 to 20 wt %.

There are no specific limitations to the organoaluminum compound (B) (hereinafter may be simply referred to as "component (B)") used for preparing the catalyst for olefin polymerization of the present invention, inasmuch as the compound has a structure of the above formula (1). In the formula (1), an ethyl group and isobutyl group are preferable as $R^1$, a hydrogen atom, chlorine atom, and bromine atom are preferable as Q, and p is preferably an integer of 2 or 3, and particularly preferably 3. As specific examples of such an organoaluminum compound (B), triethylaluminum, diethylaluminum chloride, triisobutylaluminum, diethylaluminum bromide, and diethylaluminum hydride can be given. These compounds may be used either individually or in combination of two or more. Triethylaluminum and triisobutylaluminum are preferably used.

The compounds represented by the above formula (2) can be given as the organosilicon compound (C) used for preparing the catalyst for the polymerization of olefins in the present invention.

Specifically, such compounds include cyclohexylcyclopentyldialkoxysilane, its derivatives having a substituent on the cyclohexyl group or cyclopentyl group, dicyclohexyldialkoxysilane, and its derivatives having a substituents on the cyclohexyl group.

As specific examples of such an organosilicon compound (C), cyclohexylcyclopentyldimethoxysilane, cyclohexylcyclopentyldiethoxysilane, cyclohexylcyclopentyldipropoxysilane, dicyclohexyldimethoxysilane, dicyclohexyldiethoxysilane, dicyclohexyldipropoxysilane, and the like can be given.

Although various derivatives of the organosilicon compound may be used, organosilicon derivatives having a cyclohexyl group with 1–3 alkyl substituents (e.g a methyl group or ethyl group) on the 3, 4, or 5 position of the cyclohexyl group and organosilicon derivatives having a cyclopentyl group with 1–3 alkyl substituents (e.g a methyl group or ethyl group) or halogen atom substituents (e.g. a chlorine atom or bromine atom) on the 2, 3, or 5 position of the cyclopentyl group are preferable. The number of the alkyl group substituent on each one of the above positions of cyclohexyl group and cyclopentyl group is one or two. The substitution of the alkyl group to each site can use the derivatives of the combined organosilicon compound. Derivatives of organosilicon compound with one alkyl group substitution or two or more alkyl group substitutions can be used.

As specific examples of the derivative of an organosilicon compound having a substituent on the cyclohexyl group or cyclopentyl group,
3-methylcyclohexylcyclopentyldimethoxysilane,
3-methylcyclohexylcyclopentyldiethoxysilane,
3-methylcyclohexylcyclopentyldipropoxysilane,
4-methylcyclohexylcyclopentyldimethoxysilane,
4-methylcyclohexylcyclopentyldiethoxysilane,
4-methylcyclohexylcyclopentyldipropoxysilane,
3,5-dimethylcyclohexylcyclopentyldimethoxysilane,
3,5-dimethylcyclohexylcyclopentyldiethoxysilane,
3,5-dimethylcyclohexylcyclopentyldipropoxysilane,
3,3-dimethylcyclohexylcyclopentyldimethoxysilane,
4,4-dimethylcyclohexylcyclopentyldimethoxysilane,
cyclohexyl 2-methylcyclopentyldimethoxysilane,
cyclohexyl 2-methylcyclopentyldiethoxysilane,
cyclohexyl 2-methylcyclopentyldipropoxysilane,
3-methylcyclohexyl 2-methylcyclopentyldimethoxysilane,
3-methylcyclohexyl 2-methylcyclopentyldiethoxysilane,
3-methylcyclohexyl 2-methylcyclopentyldipropoxysilane,
4-methylcyclohexyl 2-methylcyclopentyldimethoxysilane,
4-methylcyclohexyl 2-methylcyclopentyldiethoxysilane,
4-methylcyclohexyl 2-methylcyclopentyldipropoxysilane,
3,5-dimethylcyclohexyl 2-methylcyclopentyldimethoxysilane,
3,5-dimethylcyclohexyl 2-methylcyclopentyldiethoxysilane,
3,5-dimethylcyclohexyl 2-methylcyclopentyldipropoxysilane,
3,3-dimethylcyclohexyl 2-methylcyclopentyldimethoxysilane,
4,4-dimethylcyclohexyl 2-methylcyclopentyldimethoxysilane,
cyclohexyl 3-methylcyclopentyldimethoxysilane,
cyclohexyl 3-methylcyclopentyldiethoxysilane,
cyclohexyl 3-methylcyclopentyldipropoxysilane,
3-methylcyclohexyl 3-methylcyclopentyldimethoxysilane,
3-methylcyclohexyl 3-methylcyclopentyldiethoxysilane,
3-methylcyclohexyl 3-methylcyclopentyldipropoxysilane,
4-methylcyclohexyl 3-methylcyclopentyldimethoxysilane,
4-methylcyclohexyl 3-methylcyclopentyldiethoxysilane,
4-methylcyclohexyl 3-methylcyclopentyldipropoxysilane,
3,5-dimethylcyclohexyl 3-methylcyclopentyldimethoxysilane,
3,5-dimethylcyclohexyl 3-methylcyclopentyldiethoxysilane,
3,5-dimethylcyclohexyl 3-methylcyclopentyldipropoxysilane,
3,3-dimethylcyclohexyl 3-methylcyclopentyldimethoxysilane,
4,4-dimethylcyclohexyl 3-methylcyclopentyldimethoxysilane,
cyclohexyl 2,3-dimethylcyclopentyldimethoxysilane,
cyclohexyl 2,3-dimethylcyclopentyldiethoxysilane,
cyclohexyl 2,3-dimethylcyclopentyldipropoxysilane,
3-methylcyclohexyl 2,3-dimethylcyclopentyldimethoxysilane,
3-methylcyclohexyl 2,3-dimethylcyclopentyldiethoxysilane, 3-methylcyclohexyl 2,3-dimethylcyclopentyldipropoxysilane,
4-methylcyclohexyl 2,3-dimethylcyclopentyldimethoxysilane,
4-methylcyclohexyl 2,3-dimethylcyclopentyldiethoxysilane,
4-methylcyclohexyl 2,3-dimethylcyclopentyldipropoxysilane,
3,5-dimethylcyclohexyl 2,3-dimethylcyclopentyldimethoxysilane,
3,5-dimethylcyclohexyl 2,3-dimethylcyclopentyldiethoxysilane,
3,5-dimethylcyclohexyl 2,3-dimethylcyclopentyldipropoxysilane,
3,3-dimethylcyclohexyl 2,3-dimethylcyclopentyldimethoxysilane,
4,4-dimethylcyclohexyl 2,3-dimethylcyclopentyldimethoxysilane,
cyclohexyl 2,5-dimethylcyclopentyldimethoxysilane,
cyclohexyl 2,5-dimethylcyclopentyldiethoxysilane,
cyclohexyl 2,5-dimethylcyclopentyldipropoxysilane,
3-methylcyclohexyl 2,5-dimethylcyclopentyldimethoxysilane,
3-methylcyclohexyl 2,5-dimethylcyclopentyldiethoxysilane,
3-methylcyclohexyl 2,5-dimethylcyclopentyldipropoxysilane,
4-methylcyclohexyl 2,5-dimethylcyclopentyldimethoxysilane,
4-methylcyclohexyl 2,5-dimethylcyclopentyldiethoxysilane,
4-methylcyclohexyl 2,5-dimethylcyclopentyldipropoxysilane,
3,5-dimethylcyclohexyl 2,5-dimethylcyclopentyldimethoxysilane,
3,5-dimethylcyclohexyl 2,5-dimethylcyclopentyldiethoxysilane,
3,5-dimethylcyclohexyl 2,5-dimethylcyclopentyldipropoxysilane,
3,3-dimethylcyclohexyl 2,5-dimethylcyclopentyldimethoxysilane,
4,4-dimethylcyclohexyl 2,5-dimethylcyclopentyldimethoxysilane,
cyclohexyl 2,2-dimethylcyclopentyldimethoxysilane,
cyclohexyl 2,2-dimethylcyclopentyldiethoxysilane,
cyclohexyl 2,2-dimethylcyclopentyldipropoxysilane,
3-methylcyclohexyl 2,2-dimethylcyclopentyldimethoxysilane,
3-methylcyclohexyl 2,2-dimethylcyclopentyldiethoxysilane,
3-methylcyclohexyl 2,2-dimethylcyclopentyldipropoxysilane,
4-methylcyclohexyl 2,2-dimethylcyclopentyldimethoxysilane,
4-methylcyclohexyl 2,2-dimethylcyclopentyldiethoxysilane,
4-methylcyclohexyl 2,2-dimethylcyclopentyldipropoxysilane,
3,5-dimethylcyclohexyl 2,2-dimethylcyclopentyldimethoxysilane,
3,5-dimethylcyclohexyl 2,2-dimethylcyclopentyldiethoxysilane,
3,5-dimethylcyclohexyl 2,2-dimethylcyclopentyldipropoxysilane,
3,3-dimethylcyclohexyl 2,2-dimethylcyclopentyldimethoxysilane,
4,4-dimethylcyclohexyl 2,2-dimethylcyclopentyldimethoxysilane,
cyclohexyl 3,3-dimethylcyclopentyldimethoxysilane,
cyclohexyl 3,3-dimethylcyclopentyldiethoxysilane,
cyclohexyl 3,3-dimethylcyclopentyldipropoxysilane,
3-methylcyclohexyl 3,3-dimethylcyclopentyldimethoxysilane,
3-methylcyclohexyl 3,3-dimethylcyclopentyldiethoxysilane,
3-methylcyclohexyl 3,3-dimethylcyclopentyldipropoxysilane,
4-methylcyclohexyl 3,3-dimethylcyclopentyldimethoxysilane,
4-methylcyclohexyl 3,3-dimethylcyclopentyldiethoxysilane,
4-methylcyclohexyl 3,3-dimethylcyclopentyldipropoxysilane,
3,5-dimethylcyclohexyl 3,3-dimethylcyclopentyldimethoxysilane,
3,5-dimethylcyclohexyl 3,3-dimethylcyclopentyldiethoxysilane,
3,5-dimethylcyclohexyl 3,3-dimethylcyclopentyldipropoxysilane,
3,3-dimethylcyclohexyl 3,3-dimethylcyclopentyldimethoxysilane,
4,4-dimethylcyclohexyl 3,3-dimethylcyclopentyldimethoxysilane,
3-chlorocyclohexylcyclopentyldimethoxysilane,
4-chlorocyclohexylcyclopentyldimethoxysilane,
3,5-dichlorocyclohexylcyclopentyldimethoxysilane,
cyclohexyl 2-chlorocyclopentyldimethoxysilane,
cyclohexyl 3-cyclopentyldimethoxysilane,
cyclohexyl 2,3-dichlorocyclopentyldimethoxysilane,
cyclohexyl 2,5-cyclopentyldimethoxysilane,
3-chlorocyclohexyl 2-chlorocyclopentyldimethoxysilane,
4-chlorocyclohexyl 3-chlorocyclopentyldimethoxysilane,
3,5-dichlorocyclohexyl 2,3-dichlorocyclopentyldimethoxysilane,
cyclohexyl 2,5-dichlorocyclopentyldimethoxysilane, and the like can be given.

As specific examples of the organosilicon compound derivative having a substituent on the cyclohexyl group,
3-methylcyclohexylcyclohexyldimethoxysilane,
3-methylcyclohexylcyclohexyldiethoxysilane,
3-methylcyclohexylcyclohexyldipropoxysilane,
4-methylcyclohexylcyclohexyldimethoxysilane,
4-methylcyclohexylcyclohexyldiethoxysilane,
4-methylcyclohexylcyclohexyldipropoxysilane,
3,5-dimethylcyclohexylcyclohexyldimethoxysilane,
3,5-dimethylcyclohexylcyclohexyldiethoxysilane,
3,5-dimethylcyclohexylcyclohexyldipropoxysilane,
3,3-dimethylcyclohexylcyclohexyldimethoxysilane,
4,4-dimethylcyclohexylcyclohexyldimethoxysilane,
3-methylcyclohexyl 2-methylcyclohexyldimethoxysilane,
3-methylcyclohexyl 2-methylcyclohexyldiethoxysilane,
3-methylcyclohexyl 2-methylcyclohexyldipropoxysilane,
4-methylcyclohexyl 2-methylcyclohexyldimethoxysilane,
4-methylcyclohexyl 2-methylcyclohexyldiethoxysilane,
4-methylcyclohexyl 2-methylcyclohexyldipropoxysilane,
3,5-dimethylcyclohexyl 2-methylcyclohexyldimethoxysilane,
3,5-dimethylcyclohexyl 2-methylcyclohexyldiethoxysilane,
3,5-dimethylcyclohexyl 2-methylcyclohexyldipropoxysilane,
3,3-dimethylcyclohexyl 2-methylcyclohexyldimethoxysilane, 4,4-dimethylcyclohexyl 2-methylcyclohexyldimethoxysilane,
bis(3-methylcyclohexyl)dimethoxysilane,
bis(3-methylcyclohexyl)diethoxysilane,
bis(3-methylcyclohexyl)dipropoxysilane,
4-methylcyclohexyl 3-methylcyclohexyldimethoxysilane,
4-methylcyclohexyl 3-methylcyclohexyldiethoxysilane,
4-methylcyclohexyl 3-methylcyclohexyldipropoxysilane,
3,5-dimethylcyclohexyl 3-methylcyclohexyldimethoxysilane,
3,5-dimethylcyclohexyl 3-methylcyclohexyldiethoxysilane,
3,5-dimethylcyclohexyl 3-methylcyclohexyldipropoxysilane,
3,3-dimethylcyclohexyl 3-methylcyclohexyldimethoxysilane,
4,4-dimethylcyclohexyl 3-methylcyclohexyldimethoxysilane,
3-methylcyclohexyl 2,3-dimethylcyclohexyldimethoxysilane,
3-methylcyclohexyl 2,3-dimethylcyclohexyldiethoxysilane,
3-methylcyclohexyl 2,3-dimethylcyclohexyldipropoxysilane,
4-methylcyclohexyl 2,3-dimethylcyclohexyldimethoxysilane,
4-methylcyclohexyl 2,3-dimethylcyclohexyldiethoxysilane,
4-methylcyclohexyl 2,3-dimethylcyclohexyldipropoxysilane,
3,5-dimethylcyclohexyl 2,3-dimethylcyclohexyldimethoxysilane,
3,5-dimethylcyclohexyl 2,3-dimethylcyclohexyldiethoxysilane,
3,5-dimethylcyclohexyl 2,3-dimethylcyclohexyldipropoxysilane,
3,3-dimethylcyclohexyl 2,3-dimethylcyclohexyldimethoxysilane,
4,4-dimethylcyclohexyl 2,3-dimethylcyclohexyldimethoxysilane,
3-methylcyclohexyl 2,5-dimethylcyclohexyldimethoxysilane,
3-methylcyclohexyl 2,5-dimethylcyclohexyldiethoxysilane,
3-methylcyclohexyl 2,5-dimethylcyclohexyldipropoxysilane,
4-methylcyclohexyl 2,5-dimethylcyclohexyldimethoxysilane,
4-methylcyclohexyl 2,5-dimethylcyclohexyldiethoxysilane,
4-methylcyclohexyl 2,5-dimethylcyclohexyldipropoxysilane,
3,5-dimethylcyclohexyl 2,5-dimethylcyclohexyldimethoxysilane,
3,5-dimethylcyclohexyl 2,5-dimethylcyclohexyldiethoxysilane,
3,5-dimethylcyclohexyl 2,5-dimethylcyclohexyldipropoxysilane,
3,3-dimethylcyclohexyl 2,5-dimethylcyclohexyldimethoxysilane,
4,4-dimethylcyclohexyl 2,5-dimethylcyclohexyldimethoxysilane,
3-methylcyclohexyl 2,2-dimethylcyclohexyldimethoxysilane,
3-methylcyclohexyl 2,2-dimethylcyclohexyldiethoxysilane,
3-methylcyclohexyl 2,2-dimethylcyclohexyldipropoxysilane,
4-methylcyclohexyl 2,2-dimethylcyclohexyldimethoxysilane,
4-methylcyclohexyl 2,2-dimethylcyclohexyldiethoxysilane,
4-methylcyclohexyl 2,2-dimethylcyclohexyldipropoxysilane,
3,5-dimethylcyclohexyl 2,2-dimethylcyclohexyldimethoxysilane,
3,5-dimethylcyclohexyl 2,2-dimethylcyclohexyldiethoxysilane,
3,5-dimethylcyclohexyl 2,2-dimethylcyclohexyldipropoxysilane,
3,3-dimethylcyclohexyl 2,2-dimethylcyclohexyldimethoxysilane,
4,4-dimethylcyclohexyl 2,2-dimethylcyclohexyldimethoxysilane,
3-methylcyclohexyl 3,3-dimethylcyclohexyldimethoxysilane,
3-methylcyclohexyl 3,3-dimethylcyclohexyldiethoxysilane,
3-methylcyclohexyl 3,3-dimethylcyclohexyldipropoxysilane,
4-methylcyclohexyl 3,3-dimethylcyclohexyldimethoxysilane,
4-methylcyclohexyl 3,3-dimethylcyclohexyldiethoxysilane,
4-methylcyclohexyl 3,3-dimethylcyclohexyldipropoxysilane,
3,5-dimethylcyclohexyl 3,3-dimethylcyclohexyldimethoxysilane,
3,5-dimethylcyclohexyl 3,3-dimethylcyclohexyldiethoxysilane,
3,5-dimethylcyclohexyl 3,3-dimethylcyclohexyldipropoxysilane,
3,3-dimethylcyclohexyl 3,3-dimethylcyclohexyldimethoxysilane,
4,4-dimethylcyclohexyl 3,3-dimethylcyclopentyldimethoxysilane,
3-chlorocyclohexylcyclohexyldimethoxysilane,
4-chlorocyclohexylcyclohexyldimethoxysilane,
3,5-dichlorocyclohexylcyclohexyldimethoxysilane,
cyclohexyl 2-chlorocyclohexyldimethoxysilane,
cyclohexyl 3-cyclohexyldimethoxysilane,
cyclohexyl 2,3-dichlorocyclohexyldimethoxysilane,
cyclohexyl 2,5-cyclohexyldimethoxysilane,
3-chlorocyclohexyl 2-chlorocyclohexyldimethoxysilane,
4-chlorocyclohexyl 3-chlorocyclohexyldimethoxysilane,
3,5-dichlorocyclohexyl 2,3-dichlorocyclohexyldimethoxysilane,
cyclohexyl 2,5-cyclohexyldimethoxysilane,
and the like can be given.

Of these, particularly preferable organosilicon compounds are
cyclohexylcyclopentyldimethoxysilane,
cyclohexylcyclopentyldiethoxysilane,
dicyclohexyldimethoxysilane,
dicyclohexyldiethoxysilane,
3-methylcyclohexylcyclopentyldimethoxysilane,
4-methylcyclohexylcyclopentyldimethoxysilane,
3,5-dimethylcyclohexylcyclopentyldimethoxysilane,
3-methylcyclohexylcyclohexyldimethoxysilane,
4-methylcyclohexylcyclohexyldimethoxysilane,
and 3,5-dimethylcyclohexylcyclohexyldimethoxysilane.

Either one type of these organosilicon compounds (C) or a combination of two or more types of these compounds can be used.

The organosilicon compound (D) (hereinafter may be simply referred to as "component (D)") used for preparing the catalyst for olefin polymerization of the present invention is a compound having a structure of the above formula (3). Specifically, the compound is a tetraalkoxysilane compound or a halogen-containing organosilicon compound. As the halogen-containing organosilicon compound, trialkoxysilane halide, dialkoxysilane dihalide, alkyl dialkoxysilane halide, cycloalkyl dialkoxysilane halide, monohalogenated alkyltrialkoxysilane, dihalogenated alkyltrialkoxysilane, bis(monohalogenated alkyl)dialkoxysilane, and bis(dihalogenated alkyl)dialkoxysilane can be given. As the trialkoxy halide, dialkoxy dihalide, alkyl dialkoxysilane halide, and cycloalkyl dialkoxysilane halide, trialkoxychlorosilane, trialkoxybromosilane, dialkoxydichlorosilane, dialkoxydibromosilane, cycloalkyldialkoxychlorosilane, and cycloalkyldialkoxybromosilane can be given. Of these compounds, tetraalkoxysilane, trialkoxy halide, dialkoxy dihalide, and mono halogen-substituted alkyl trialkoxysilane are preferable.

Specific compounds among the tetraalkoxysilane compound are tetramethoxysilane, tetraethoxysilane, tetrapropoxysilane, and tetrabutoxysilane.

Among the halogen-containing organosilicon compounds, as the compound in which a halogen atom directly bonds to the silicon atom, trimethoxychlorosilane, triethoxychlorosilane, trimethoxybromosilane, triethoxybromosilane, dimethoxydichlorosilane, diethoxydichlorosilane, dimethoxydibromosilane, diethoxydibromosilane, methyldimethoxychlorosilane, methyldiethoxychlorosilane, methyldimethoxybromosilane, methyldiethoxybromosilane, ethyldimethoxychlorosilane, ethyldiethoxychlorosilane, ethyldimethoxybromosilane, ethyldiethoxybromosilane, n-propyldimethoxychlorosilane, n-propyldiethoxychlorosilane, n-propyldimethoxybromosilane, n-propyldiethoxybromosilane, isopropyldimethoxychlorosilane, isopropyldiethoxychlorosilane, isopropyldimethoxybromosilane, isopropyldiethoxybromosilane, n-butyldimethoxychlorosilane, n-butyldiethoxychlorosilane, n-butyldimethoxybromosilane, n-butyldiethoxybromosilane, isobutyldimethoxychlorosilane, isobutyldiethoxychlorosilane, isobutyldimethoxybromosilane, isobutyldiethoxybromosilane, t-butyldimethoxychlorosilane, t-butyldiethoxychlorosilane, t-butyldimethoxybromosilane, t-butyldiethoxybromosilane, n-pentyldimethoxychlorosilane, n-pentyldiethoxychlorosilane, n-pentyldimethoxybromosilane, n-pentyldiethoxybromosilane, iso-pentyldimethoxychlorosilane, iso-pentyldiethoxychlorosilane, iso-pentyldimethoxybromosilane, iso-pentyldiethoxybromosilane, neopentyldimethoxychlorosilane, neopentyldiethoxychlorosilane, neopentyldimethoxybromosilane, neopentyldiethoxybromosilane, n-hexyldimethoxychlorosilane, n-hexyldiethoxychlorosilane, n-hexyldimethoxybromosilane, n-hexyldiethoxybromosilane, n-heptyldimethoxychlorosilane, n-heptyldiethoxychlorosilane, n-heptyldimethoxybromosilane, n-heptyldiethoxybromosilane, n-octyldimethoxychlorosilane, n-octyldiethoxychlorosilane, n-octyldimethoxybromosilane, n-octyldiethoxybromosilane, iso-octyldimethoxychlorosilane, iso-octyldiethoxychlorosilane, iso-octyldimethoxybromosilane, iso-octyldiethoxybromosilane, cyclohexyldimethoxychlorosilane, cyclohexyldiethoxychlorosilane, cyclohexyldimethoxybromosilane, cyclohexyldiethoxybromosilane, cyclopentyldimethoxychlorosilane, cyclopentyldiethoxychlorosilane, cyclopentyldimethoxybromosilane, and cyclopentyldiethoxybromosilane can be given.

As the halogen-containing organic compound containing an alkyl halide, $ClCH_2Si(OCH_3)_3$, $ClCH_2Si(OC_2H_5)_3$, $Cl_2CHSi(OCH_3)_3$, $Cl_2CHSi(OC_2H_5)_3$, $BrCH_2Si(OCH_3)_3$, $BrCH_2Si(OC_2H_5)_3$, $Br_2CHSi(OCH_3)_3$, $Br_2CHSi(OC_2H_5)_3$, $ClC_2H_4Si(OCH_3)_3$, $ClC_2H_4Si(OC_2H_5)_3$, $Cl_2C_2H_3Si(OCH_3)_3$, $Cl_2C_2H_3Si(OC_2H_5)_3$, $BrC_2H_4Si(OCH_3)_3$, $BrC_2H_4Si(OC_2H_5)_3$, $Br_2C_2H_3Si(OCH_3)_3$, $Br_2C_2H_3Si(OC_2H_5)_3$, $(ClCH_2)_2Si(OCH_3)_2$, $(ClCH_2)_2Si(OC_2H_5)_2$, $(Cl_2CH)_2Si(OCH_3)_2$, $(Cl_2CH)_2Si(OC_2H_5)_2$, $(BrCH_2)_2Si(OCH_3)_2$, $(BrCH_2)_2Si(OC_2H_5)_2$, $(Br_2CH)_2Si(OCH_3)_2$, $(Br_2CH)_2Si(OC_2H_5)_2$, $(ClC_2H_4)_2Si(OCH_3)_2$, $(ClC_2H_4)_2Si(OC_2H_5)_2$, $(Cl_2C_2H_3)_2Si(OCH_3)_2$, $(Cl_2C_2H_3)_2Si(OC_2H_5)_2$, $(BrC_2H_4)_2Si(OCH_3)_2$, $(BrC_2H_4)_2Si(OC_2H_5)_2$, $(Br_2C_2H_3)_2Si(OCH_3)_2$, $(Br_2C_2H_3)_2Si(OC_2H_5)_2$, $(ClCH_2)_3Si(OCH_3)$, $(ClCH_2)_3Si(OC_2H_5)$, $(Cl_2CH)_3Si(OCH_3)$, $(Cl_2CH)_3Si(OC_2H_5)$, $(BrCH_2)_3Si(OCH_3)$, $(BrCH_2)_3Si(OC_2H_5)$, $(Br_2CH)_3Si(OCH_3)$, $(Br_2CH)_3Si(OC_2H_5)$, $(ClC_2H_4)_3Si(OCH_3)$, $(ClC_2H_4)_3Si(OC_2H_5)$, $(Cl_2C_2H_3)_3Si(OCH_3)$, $(Cl_2C_2H_3)_3Si(OC_2H_5)$, $(BrC_2H_4)_3Si(OCH_3)$, $(BrC_2H_4)_3Si(OC_2H_5)$, $(Br_2C_2H_3)_3Si(OCH_3)$, $(Br_2C_2H_3)_3Si(OC_2H_5)$, and the like can be given.

Of the above compounds, $ClCH_2Si(OCH_3)_3$, $ClCH_2Si(OC_2H_5)_3$, $BrCH_2Si(OCH_3)_3$, $BrCH_2Si(OC_2H_5)_3$, $(ClCH_2)_2Si(OCH_3)_2$, $(ClCH_2)_2Si(OC_2H_5)_2$, $(BrC_2H_4)_2Si(OCH_3)_2$, and $(BrC_2H_4)_2Si(OC_2H_5)_2$ are preferable.

Of these, tetraethoxysilane, triethoxychlorosilane, diethoxydichlorosilane, and $ClCH_2Si(OC_2H_5)_3$ are particularly preferred. These compounds can be used either individually or in combinations of two or more.

Preferable combinations of the component (C) and the component (D) are as follows.

| Component (C) | Component (D) |
| --- | --- |
| Cyclohexylcyclopentyldimethoxysilane | Tetraethoxysilane |
| Cyclohexylcyclopentyldimethoxysilane | Triethoxychlorosilane |
| Cyclohexylcyclopentyldimethoxysilane | Diethoxydichlorosilane |
| Dicyclohexyldimethoxysilane | Tetraethoxysilane |
| Dicyclohexyldimethoxysilane | Triethoxychlorosilane |
| Dicyclohexyldimethoxysilane | Diethoxydichlorosilane |

Olefins can be polymerized or copolymerized using the catalyst for olefin polymerization of the present invention. The olefins such as ethylene, propylene, 1-butene, 1-pentene, 4-methyl-1-pentene, and vinyl cyclohexane can be used either individually or in combination of two or more. Of these, ethylene, propylene, and 1-butene can be suitably used. A particularly preferable olefin is propylene. Propylene may be copolymerized with other olefins. As the olefins to be copolymerized, ethylene, 1-butene, 1-pentene, 4-methyl-1-pentene, vinyl cyclohexane, and the like can be used either individually or in combination of two or more. Of these, ethylene and 1-butene can be suitably used. As the process for copolymerizing propylene with other olefins, random copolymerization of polymerizing propylene with a small amount of ethylene in one step and propylene-ethylene block copolymerization of polymerizing only propylene in a first step (first polymerization vessel) and copolymerizing propylene and ethylene in a second step (second polymerization vessel) are typical methods. The catalyst of the present invention comprising the component (A), component (B), component (C), component (D) is effective in both the random copolymerization and block copolymerization for improving the catalytic activity, stereoregularity, catalyst activity to hydrogen, copolymerization performance, and properties of resulting copolymers.

The ratio of each component used is not specifically limited inasmuch as such a ratio does not influence the effect of the present invention. Usually, the component (B) is used in the amount of 1 to 2000 mols, and preferably 50 to 1000 mols, per one mol of titanium atom in the component (A). Each of the component (C) and the component (D) is used in an amount of 0.002–10 mols, preferably 0.01–2 mols, and particularly preferably 0.01–0.5 mols, per one mol of the component (B). The component (C) and component (D) are used at a molar ratio of 1:99 to 60:40, preferably 5:95 to 50:50, and particularly preferably 10:90 to 40:60.

Although the order of contact of the components is not limited, it is desirable to first add the organoaluminum compound (B) to the polymerization system and then cause the organosilicon compound (C) to come in contact with the component (D). The organic compounds (C) and (D) may be added to the polymerization system after mixing or may be added separately. Then, it is desirable that the solid catalyst component (A) is further contacted. A method of forming a catalyst by adding the organoaluminum compound (B) to the polymerization system, separately causing the component (A) to contact the component(C) and component (D), and feeding the contacted component (A), component (C), and component (D) to the polymerization system is also a preferable embodiment. It is possible to further improve the catalyst activity against hydrogen and crystalline properties of the resulting polymer by using a previously contacted mixture of the component (A), component (C), and component (D) in this manner.

The polymerization of the present invention can be carried out either in the presence or in the absence of an organic solvent. Olefin monomers such as propylene may be used either in a gaseous state or in a liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the catalyst formed from the component (A), component (B), component (C), and component (D), (hereinafter may be referred to as "main polymerization"), it is desirable to preliminarily polymerize the olefins prior to the main polymerization to further improve the catalyst activity, stereoregularity, properties of resulting polymer particles, and the like. In addition to the olefins used in the main polymerization, monomers such as styrene can be used in the preliminary polymerization. Specifically, after causing the component (A) to contact the component (B) and/or the component (C) and the component (D) in the presence of olefins to preliminarily polymerize 0.1 to 100 g of the polyolefins for 1 g of the component (A), the component (B) and/or the component (C) and the component (D) are further caused to contact to form the catalyst.

Although the order of contact of the components and monomers in carrying out the preliminary polymerization is optional, it is desirable to first add the component (B) to the preliminary polymerization system in an inert gas or olefin gas atmosphere such as propylene, cause the component (A) to come in contact with the component (B), and then cause one or more olefins such as propylene to come in contact with the mixture.

It has been confirmed that polymerization of olefins in the presence of the olefin polymerization catalyst of the present invention can produce polymers with a broad molecular weight distribution in a high yield, while maintaining high stereoregularity of polymers, as compared with the case of polymerization using a conventional catalyst.

EXAMPLES

The present invention will be described in more detail by examples, which should not be construed as limiting the present invention.

Example 1

(Preparation of Solid Catalyst Component)

A 500 ml round bottom flask equipped with a stirrer, of which the internal atmosphere had been sufficiently replaced by nitrogen gas, was charged with 20 g of diethoxymagnesium and 160 ml of toluene to prepare a suspension. Then, 40 ml of titanium tetrachloride was added to the suspension. Next, after heating the suspension to 90° C., 5.4 ml of di-n-butyl phthalate was added and the mixture was further heated to 110° C. and reacted for 1.5 hours with stirring. After the reaction, the resulting reaction mixture was washed three times with 180 ml of toluene at 90° C. After the addition of 140 ml of toluene and 40 ml of titanium tetrachloride, the reaction mixture was heated to 100° C. and reacted for two hours with stirring. The reaction product mixture was washed eight times with 200 ml of heptane at 40° C., filtered, and dried to obtain a solid catalyst component (A) in the form of a powder. The content of titanium in this solid catalyst composition was 2.9 wt %.

(Preparation of Polymerization Catalyst and Polymerization)

A 2.0 l autoclave equipped with a stirrer, of which the internal atmosphere had been entirely replaced by nitrogen gas, was charged with 1.32 mmol of triethylaluminum, 0.026 mmol of cyclohexylcyclopentyl dimethoxysilane, 0.104 mmol of tetraethoxysilane, and the above solid catalyst composition (A) in an amount, in terms of the titanium atom contained therein, of 0.0026 mmol, thereby forming a polymerization catalyst. Then, with the addition of 1.5 l of hydrogen gas and 1.4 l of liquified propylene, preliminary polymerization was carried out for five minutes at 20° C., following which the preliminary polymerization product was heated and main polymerization was carried out for one hour at 70° C. The polymerization activity, the heptane insoluble matters (HI), the melt index (MI), and the molecular weight distribution of the resulting polymer are shown in Table 1. The results of polymerization are also shown in Table 1.

The polymerization activity per 1 g of the solid catalyst component was calculated according to the following formula:

Polymerization activity=Produced polymer $(F)$ (g)/ Solid catalyst component (g)

The polymer (G) insoluble in n-heptane determined by extracting this polymer for six hours in boiling n-heptane was measured to determine the proportion of components insoluble in boiling n-heptane (HI) in this polymer according to the following formula:

$HI=(G)(g)/(F)(g)$

The melt index (MI) of the polymer was determined according to the test method conforming to ASTM D1238 or JIS K7210.

The molecular weight distribution of polymers was evaluated by the ratio (Mw/Mn) of the weight average molecular weight (Mw) to the number average molecular weight (Mn) and the ratio (Mz/Mw) of the Z-average molecular weight (Mz) to the weight average molecular weight (Mw), measured by cross fractionation chromatography (CFC) using CFC T-150B (manufactured by Mitsubishi Chemical Corp.) under the following conditions.

Solvent: o-dichlorobenzene (ODCB)
Temperature: 140° C. (SEC)
Column: Shodex GPC UT-806M Sample concentration: 4 g/l-ODCB (200 mg/50 ml-ODCB)
Charge amount: 0.5 ml
Flow rate: 1.0 ml/min
Temperature: 0° C. to 140° C.

Example 2

The same experiment as in Example 1 was carried out, except for using 0.052 mmol of cyclohexylcyclopentyldimethoxysilane and 0.078 mmol of tetraethoxysilane instead of 0.026 mmol of cyclohexylcyclopentyldimethoxysilane and 0.104 mmol of tetraethoxysilane, and using 1.8 l of hydrogen gas. The results are shown in Table 1.

Example 3

The same experiment as in Example 1 was carried out, except for using 0.104 mmol of triethoxysilane instead of 0.104 mmol of tetraethoxysilane and using 1.6 l of hydrogen gas. The results are shown in Table 1.

Example 4

The same experiment as in Example 2 was carried out, except for using 0.078 mmol of triethoxysilane instead of 0.078 mmol of tetraethoxysilane and using 2.0 l of hydrogen gas. The results are shown in Table 1.

Example 5

The same experiment as in Example 1 was carried out, except for using 0.026 mmol of dicyclohexyldimethoxysilane instead of 0.026 mmol of cyclohexylcyclopentyldimethoxysilane and using 0.8 l of hydrogen gas. The results are shown in Table 1.

Example 6

The same experiment as in Example 2 was carried out, except for using 0.052 mmol of dicyclohexyldimethoxysilane instead of 0.052 mmol of cyclohexylcyclopentyldimethoxysilane and using 1.0 l of hydrogen gas. The results are shown in Table 1.

Example 7

(Preparation of Solid Catalyst Component)

A 500 ml round bottom flask equipped with a stirrer, of which the internal atmosphere had been sufficiently replaced by nitrogen gas, was charged with 4.76 g of anhydrous magnesium chloride, 25 ml of decane, and 23.4 ml of 2-ethylhexyl alcohol. The mixture was reacted for two hours at 130° C. to obtain a homogeneous solution. Then, 1.11 g of phthalic anhydride was added to the homogeneous solution and the mixture was reacted at 130° C. for one hour. The resulting reaction solution was added dropwise over one hour to 200 ml of titanium tetrachloride maintained at −20° C. in another 500 ml round bottom flask equipped with a stirrer, of which the internal atmosphere had been sufficiently replaced by nitrogen gas. The mixed solution was heated to 110° C. over four hours and 2.68 ml of diisobutyl phthalate was added. The mixture was reacted for two hours. After the reaction, the liquid portion was removed by filtration. The remaining solid was washed with decane and hexane at 110° C. until no free titanium compounds were detected, filtered, and dried to obtain a solid catalyst component in the form of a powder. The content of titanium in the solid catalyst component was analyzed and found to be 3.1 wt %.

(Preparation of Polymerization Catalyst and Polymerization)

A polymerization catalyst was prepared and polymerization was carried out in the same manner as in Example 1, except for using the solid catalyst component prepared above. The results are shown in Table 1.

Example 8

(Preparation of Solid Catalyst Component)

A 1,000 ml round bottom flask equipped with a stirrer, of which the internal atmosphere had been sufficiently replaced by nitrogen gas, was charged with 32 g of magnesium flake used as a Grignard agent. A mixture of 120 g of butyl chloride and 500 ml of dibutyl ether was added to the magnesium over four hours at 50° C., then the mixture was reacted for one hour at 60° C. After the reaction, the reaction solution was cooled to room temperature and the solid components were removed by filtration to obtain a solution of the magnesium compound. 150 ml of the magnesium compound was added dropwise over four hours at 5° C. to a homogeneous solution which was prepared from 240 ml of hexane, 5.4 g of tetrabutoxy titanium, and 61.4 g of tetraethoxy silane in a 500 ml round bottom flask equipped with a stirrer, of which the internal atmosphere had been sufficiently replaced by nitrogen gas. After the reaction, the mixture was stirred for one hour at room temperature. The resulting reaction mixture was filtered at room temperature to remove the liquid portion. The resulting solid was washed eight times with 240 ml of hexane, and dried under reduced pressure to obtain a solid product. 8.6 g of the solid product was added to a 100 ml round bottom flask equipped with a stirrer, of which the internal atmosphere had been sufficiently replaced by nitrogen gas, followed by the addition of 48 ml of toluene and 5.8 ml of diisobutyl phthalate. The mixture was reacted for one hour at 95° C. Next, the liquid portion was removed by filtration and the solid residue was washed eight times with 85 ml of toluene. After washing, 21 ml of toluene, 0.48 ml of diisobutyl phthalate, and 12.8 ml of titanium tetrachloride were added to the flask. Then, the mixture was reacted at 95° C. for eight hours. After the reaction, the solid was separated from the liquid at 95° C., washed twice with 48 ml of toluene, and again treated with diisobutyl phthalate and titanium tetrachloride under the same conditions as above. The resulting solid was washed eight times with 48 ml of hexane, filtered, and dried to obtain a solid catalyst component in the form of a powder. The content of titanium in the solid catalyst component was analyzed and found to be 2.1 wt %.

(Preparation of Polymerization Catalyst and Polymerization)

A polymerization catalyst was prepared and polymerization was carried out in the same manner as in Example 1, except for using the solid catalyst component prepared above. The results are shown in Table 1.

Comparative Example 1

A solid catalyst component and a polymerization catalyst were prepared and the polymerization was carried out in the same manner as in Example 1, except that polymerization catalyst was prepared without using tetraethoxysilane and using 2.6 l of hydrogen gas. The results are shown in Table 1.

Comparative Example 2

A solid catalyst component and a polymerization catalyst were prepared and the polymerization was carried out in the same manner as in Example 1, except that polymerization catalyst was prepared without using cyclohexylcyclopentyldimethoxysilane and using 0.5 l of hydrogen gas. The results are shown in Table 1.

Comparative Example 3

A solid catalyst component and a polymerization catalyst were prepared and the polymerization was carried out in the same manner as in Example 3, except that polymerization catalyst was prepared without using cyclohexylcyclopentyldimethoxysilane and using 0.5 l of hydrogen gas. The results are shown in Table 1.

Comparative Example 4

A solid catalyst component and a polymerization catalyst were prepared and the polymerization was carried out in the same manner as in Example 5, except that polymerization catalyst was prepared without using tetraethoxysilane and using 2.0 l of hydrogen gas. The results are shown in Table 1.

Comparative Example 5

A solid catalyst component and a polymerization catalyst were prepared and the polymerization was carried out in the same manner as in Example 1, except that dicyclopentyldimethoxysilane was used instead of cyclohexylcyclopentyldimethoxysilane. The results are shown in Table 1.

TABLE 1

| | Polymerization activity (g-PP/g-cat.) | HI (wt %) | MI (g/10 min) | Mw/Mn | Mz/Mw |
|---|---|---|---|---|---|
| Example 1 | 45,000 | 98.4 | 5.3 | 14.6 | 10.3 |
| Example 2 | 48,100 | 98.6 | 3.5 | 11.3 | 8.3 |
| Example 3 | 42,500 | 98.5 | 5.1 | 14.1 | 12.0 |
| Example 4 | 45,500 | 98.7 | 4.8 | 12.0 | 8.1 |
| Example 5 | 48,500 | 98.1 | 3.2 | 12.9 | 10.2 |
| Example 6 | 49,800 | 98.0 | 4.0 | 11.8 | 8.9 |
| Example 7 | 40,500 | 98.3 | 5.0 | 13.5 | 10.1 |
| Example 8 | 38,600 | 98.1 | 5.5 | 13.8 | 10.0 |
| Comparative Example 1 | 56,300 | 98.6 | 4.8 | 10.5 | 6.9 |
| Comparative Example 2 | 24,000 | 98.0 | 6.5 | 9.2 | 8.9 |
| Comparative Example 3 | 23,600 | 98.7 | 5.7 | 9.0 | 8.0 |

TABLE 1-continued

| | Polymerization activity (g-PP/g-cat.) | HI (wt %) | MI (g/10 min) | Mw/Mn | Mz/Mw |
|---|---|---|---|---|---|
| Comparative Example 4 | 53,500 | 97.8 | 6.3 | 10.8 | 9.2 |
| Comparative Example 5 | 48,500 | 98.5 | 3.1 | 9.5 | 8.1 |

The invention claimed is:

1. A catalyst for olefin polymerization comprising:
    (A) a solid catalyst component prepared by causing (a) a magnesium compound, (b) a tetravalent titanium halide compound, and (c) an electron donor compound to come in contact with each other,
    (B) an organoaluminum compound of the following formula (1), $$R^1_p AlQ_{3-p} \tag{1}$$

wherein $R^1$ represents an alkyl group having 1–4 carbon atoms, Q represents a hydrogen atom or a halogen atom, and p represents a real number satisfying the formula $0<p\leq 3$,
    (C) cyclohexycyclopentyldimethoxysilane,
    (D) an organosilicon compound of the following formula (3), $$R^6_x Si(OR^7)_{4-x} \tag{3}$$

wherein $R^6$ individually indicates a halogen atom selected from the group consisting of a chlorine atom, a bromine atom, and an iodine atom, a linear or branched alkyl group having 1–12 carbon atoms, with one or two hydrogen atoms replaced by halogen atoms, or a linear or branched alkyl group or cycloalkyl group having 1–12 carbon-atoms, $R^7$ individually represents an alkyl group having 1–4 carbon-atoms, cycloalkyl group, phenyl group, vinyl group, allyl group, or an aralkyl group, and x is an integer of 0, 1 or 2, provided that when x is 1 or 2, at least one of $R^6$ groups is a halogen atom or a linear or branched alkyl group having 1–12 carbon atoms with one or two hydrogen atoms replaced by halogen atoms.

2. The catalyst for olefin polymerization according to claim 1, wherein the component (D) is tetraethoxysilane or triethoxychlorosilane.

3. The catalyst for olefin polymerization according to claim 1, wherein the component (D) is tetraethoxysilane.

4. A process for polymerizing olefins comprising polymerizing or copolymerizing olefins in the presence of the catalyst for olefin polymerization according to claim 1.

5. A process for polymerizing olefins comprising polymerizing or copolymerizing olefins in the presence of the catalyst for olefin polymerization according to claim 2.

6. A process for polymerizing olefins comprising polymerizing or copolymerizing olefins in the presence of the catalyst for olefin polymerization according to claim 3.

* * * * *